April 29, 1947.  H. D. MacPHERSON  2,419,580
TESTING SYSTEM FOR IMPULSE GENERATORS
Filed Feb. 24, 1945

INVENTOR
H.D. MacPHERSON
BY

ATTORNEY

Patented Apr. 29, 1947

2,419,580

UNITED STATES PATENT OFFICE 2,419,580

TESTING SYSTEM FOR IMPULSE GENERATORS

Hugh D. MacPherson, West New Brighton, N. Y., assignor to Bell Telephone Laboratories, Incorporated, New York, N. Y., a corporation of New York Application February 24, 1945, Serial No. 579,647

5 Claims. (Cl. 179—175.2)

1

This invention relates to testing arrangements for machine switching telephone systems in general and more specifically to arrangements for checking the ability of certain pulse producing equipment employed, for example, in toll switchboards of the so-called cross bar type, to accurately transmit alternate negative potential and ground pulses of predetermined duration and spacing, such as pulses employed to transmit signals over a so-called duplex telegraph circuit.

A feature of the invention resides in an arrangement comprising means including a pair of polarized and biased relays, serially included in a circuit to which said alternate negative potential and ground pulses are supplied, and so connected and arranged that one relay will alternately operate and release in response to the application and removal of negative potential and the other relay will operate and release in response to connection and disconnection of ground, whereby alternate application and removal of said negative potential pulses will be applied to a pulse registering device, but if said ground pulses are absent and only negative pulses are received the register will not be affected.

Figure 1:
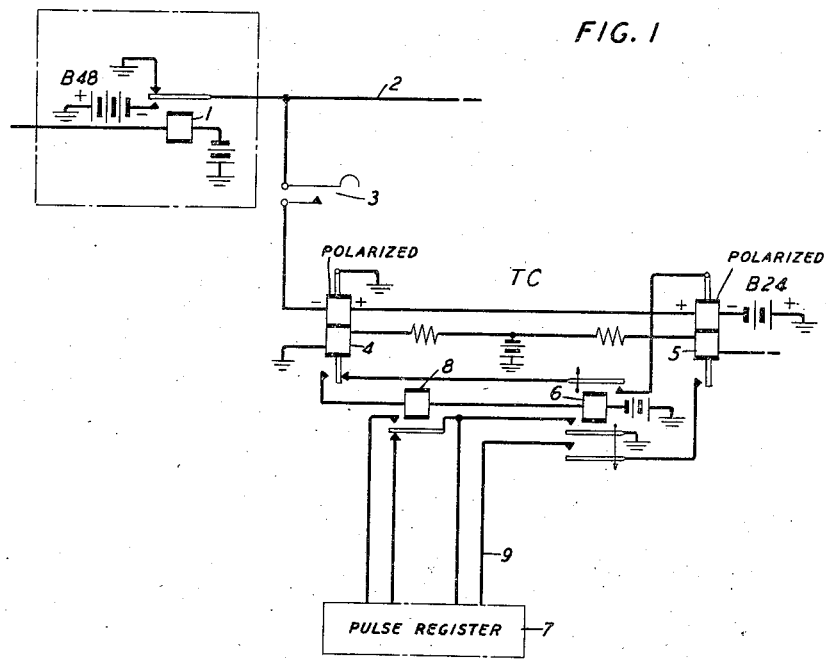
Figure 2:
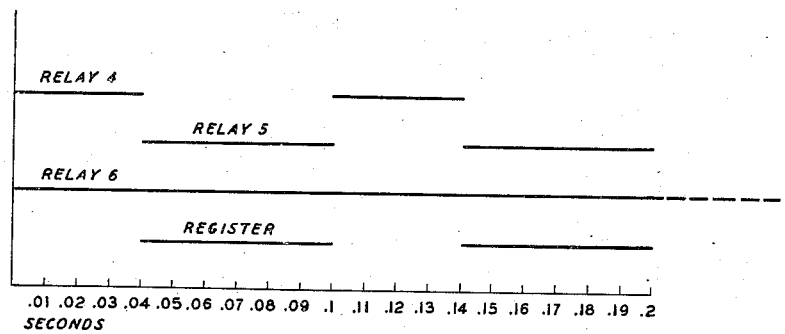
Figure 2:

The invention will be understood from the following description when read in connection with the accompanying drawing Fig. 1 of which shows a pulse producing device, the output of which can be connected at will by suitable manually-controlled switching means, through an arrangement employing four relays, to a pulse recording or registering device which will be operated only if alternate negative and ground pulses are transmitted and meet predetermined requirements as regards their duration and spacing; and Fig. 2 is a diagrammatic showing of the operate and release performance of the system of Fig. 1 under normal prescribed conditions.

The operation of the arrangement of Fig. 1 is as follows: It will be assumed that relay 1 of the pulse source shown within the broken line rectangle normally receives ten operating pulses per second from a timed operating source, not shown, which impulses are of an approximate duration of .040 second followed by an open or release interval of .060 second, and, therefore, due to the fast operating and release characteristics of relay 1, this relay transmits to a work circuit 2 potential from a battery B48 during 40 per cent (.040 second) of its operating cycle and ground closure for the remainder of the cycle, i. e., 60 per cent or .060 second.

In order to permit checking the operation of relay 1 to determine the accuracy with which it

2 conforms to the aforesaid percentage of operate and release cyclic intervals, a test circuit TC is adapted to be connected by means of test key 3 to the output of relay 1 which test circuit TC comprises a serially-connected pair of electrically biased relays 4 and 5, a neutral relay 6 which latter relay has a predetermined release time constant to be later referred to and a second neutral relay 8 to be also referred to later. A pulse recorder 7 is controlled over contacts of relays 5 and 6 from ground on the armature of relay 4.

When test key 3 is operated the next energizing pulse applied to relay 1 causes it to close its front contacts and connect the negative pole of battery B48, which we will assume has a potential of 48 volts, over contacts of key 3 and the upper serially connected windings of relays 4 and 5 to the negative terminal of a lower voltage battery B24 which has a potential of the order of 24 volts whereupon current due to the difference in potential between batteries B48 and B24 will flow through the windings of relays 4 and 5 in a right to left direction. Relays 4 and 5 are biased by current from battery B through their lower windings to normally hold their respective armatures on their back contacts but the upper winding of relay 4 is so connected that current flowing from right to left overcomes the bias effect of its lower winding and causes that relay to operate whereas the upper winding of relay 5 is connected in the circuit in an opposite sense so that the same direction of current, i. e., right to left, aids the bias effect of the lower winding whereby that relay remains released with its armature on its back contact.

When relay 4 operated it closed its front contacts to complete a circuit to operate relay 8 and slow-release relay 6 which latter relay closes one point in a circuit to control the pulse recorder 7 but due to the fact that the back contacts of relay 4 and the front contact of relay 5 are now open the recorder is not affected at this time. At the conclusion of the operated interval of relay 1 (.040 second), this relay releases and immediately closes its back contacts thereby substituting ground for the negative terminal of battery B48 which causes a reverse current, due solely to the 24-volt potential of battery B24, to flow in the upper windings of relays 4 and 5 from left to right whereupon relay 4, whose upper winding is connected to cause an operate flux to be established only when the current through its line winding flows from right to left, quickly releases with the aid of its bias flux. Relay 5, however, whose line winding is connected to produce an operating flux, in opposition to its non-operate bias, now operates when current flows from left to right.

Relay 6 is so constructed that it has a very long release time of the order of .2 second and, therefore, it will remain operated during the released interval of relay 4 during which interval relay 5 is operated and, therefore, under normal operation of relay 1 a conductor 9 will be closed to control the recorder mechanism 7 during the released interval of relay 4 and the operated interval of relay 5 which circuit is traced from ground over the back contacts of relay 4, the upper front contacts of relays 6 and 5 and the lower front contacts of relay 6. It will, therefore, be noted from the foregoing that failure of the pulse source to transmit ground to this circuit will fail to operate relay 5 and, hence, the conductor 9 will not be closed and the recorder mechanism will not be operated thus indicating a sub-standard condition in the pulse supply.

Fig. 2 shows diagrammatically the operate and release intervals of relays 4, 5 and 6, together with the consequent normal closure of the control circuit of recorder 7.

What is claimed is:

1. In a system for testing the output accuracy of a pulse producing source, a work circuit, an impulse source adapted to alternately connect direct current potential and ground to said work circuit for different predetermined time intervals and at a uniform rate of recurrence, a test circuit comprising a pair of polarized relays biased in a non-operate direction and adapted to have their operating windings in a circuit serially connected between the output of said pulse source and a voltage source of direct current of the same polarity but of lower potential than that of said pulse source, said polarized relay windings being so connected in the circuit that the respective relays are operatively energized in response to current flowing therethrough in opposite directions whereby a first one of said relays only will operate when said pulse source supplies direct current potential and the second relay only operates when ground is supplied, a slow-release relay operated in response to operation of said first polarized relay, and a pulse register controlled over a circuit which is closed when said first polarized relay is released and said slow-release relay and the second polarized relay are operated, said slow-release relay having a release time constant greater than the time cycle of said pulse source.

2. In a pulse registration system, a source of successive electrical current impulses of alternate negative and positive polarities, means for testing the output of said source including a register, a pair of polarized relays having their operate windings serially connected in a circuit supplied by the output of said source and so arranged that one of said relays will operate on current of negative polarity and release on current of positive polarity and the other relay will operate on current of positive polarity and release on current of the opposite polarity, said means also including a third relay operated in response to operation of the first one of said polarized relays and having a release time constant greater than the operated time of said first relay for completing a control circuit for said register including released contacts of the first polarized relay and operated contacts of the second.

3. In a testing system, a source of successive electrical impulses of alternate polarity and of predetermined duration and spacing, means for checking the output of said pulse source comprising a pulse registering device, circuit means including a pair of polarized relays adapted and arranged to alternately operate in response to connection thereto of said pulse source, and a slow releasing relay controlled by said first one of said polarized relays and adapted to remain operated for a predetermined interval following the release of said first relay and operation of the second to complete a circuit for operating said registering device which circuit includes released contacts of the first polarized relay and operated contacts of the second.

4. In a system for testing the output of a pulse source, a work circuit, an impulse source adapted to alternately connect direct current potential and ground to said work circuit for a predetermined time interval and at a uniform rate of recurrence, an auxiliary source of potential of the same polarity as, but of different voltage from, the potential supplied by said pulsing source, a test circuit comprising a pair of polarized relays biased in a non-operate direction and having their operate windings serially included in a circuit between the output of said impulse source and said auxiliary source of potential, said operate windings being so connected in the circuit that one relay is operated when the pulsing source transmits direct current potential and the other relay is operated only in response to transmission of ground impulses, and a pulse register controlled over a circuit including released contacts of the first relay and operated contacts of the second.

5. In a pulse registering system, a source of successive impulses of alternate negative direct current potential and ground, a register, and means for closing a circuit to control said register only when alternate impulses of direct current potential and ground are delivered by said source, said means including a pair of polarized relays having their operate windings serially and oppositely included in a circuit connected between the output of said pulse source and a direct current source of the same polarity but of different voltage from the voltage of said negative impulses.

HUGH D. MACPHERSON.

REFERENCES CITED

The following references are of record in the file of this patent:

UNITED STATES PATENTS

| Number | Name | Date |
| --- | --- | --- |
| 2,307,842 | Martin | Jan. 12, 1943 |
| 2,342,318 | Wilkerson | Feb. 22, 1944 |